US011256457B2

(12) United States Patent
Suzuki

(10) Patent No.: US 11,256,457 B2
(45) Date of Patent: Feb. 22, 2022

(54) INFORMATION PROCESSING SYSTEM UPDATING PRE-FORMATION IMAGE INFORMATION WITH NEW IMAGE INFORMATION, INFORMATION PROCESSING APPARATUS, AND NON-TRANSITORY COMPUTER READABLE MEDIUM

(71) Applicant: FUJIFILM Business Innovation Corp., Tokyo (JP)

(72) Inventor: Tatsuya Suzuki, Kanagawa (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 226 days.

(21) Appl. No.: 16/352,869

(22) Filed: Mar. 14, 2019

(65) Prior Publication Data

US 2019/0377526 A1 Dec. 12, 2019

(30) Foreign Application Priority Data

Jun. 7, 2018 (JP) .............................. JP2018-109176

(51) Int. Cl.
*G06F 3/12* (2006.01)
(52) U.S. Cl.
CPC .......... *G06F 3/1256* (2013.01); *G06F 3/1203* (2013.01); *G06F 3/1275* (2013.01); *G06F 3/1285* (2013.01)
(58) Field of Classification Search
None
See application file for complete search history.

(56) References Cited

U.S. PATENT DOCUMENTS

| 7,606,823 | B2 | 10/2009 | Kusakabe et al. | |
|---|---|---|---|---|
| 11,032,436 | B2* | 6/2021 | Horie | G06F 3/1275 |
| 2010/0017803 | A1* | 1/2010 | Shibuya | H04N 1/00347 718/100 |
| 2010/0195152 | A1* | 8/2010 | Tokumaru | H04N 1/32133 358/1.15 |
| 2011/0235097 | A1* | 9/2011 | Iwasawa | G06F 21/608 358/1.15 |

(Continued)

FOREIGN PATENT DOCUMENTS

| JP | 2006107142 | 4/2006 |
|---|---|---|
| JP | 2011204005 | 10/2011 |

*Primary Examiner* — Henok Shiferaw
(74) *Attorney, Agent, or Firm* — JCIPRNET

(57) ABSTRACT

An information processing system includes an update unit and a management unit. The update unit updates, in a case where a processing procedure relating to image formation is a new processing procedure for pre-formation image information before formation on a recording medium, the pre-formation image information being generated in accordance with a previous processing procedure, the pre-formation image information with new image information that is generated in accordance with the new processing procedure. The management unit includes a distribution section, the distribution section distributing, in a case of accepting, from a recipient that is associated with the new processing procedure, a formation instruction for an image that is associated with the new image information used by the update unit, the image associated with the new image information to an image forming unit, among image forming units, that is operated by the recipient.

18 Claims, 7 Drawing Sheets

(56) References Cited

U.S. PATENT DOCUMENTS

| | | | | |
|---|---|---|---|---|
| 2014/0282569 A1* | 9/2014 | Kamimoto | ......... | H04N 1/00225 |
| | | | | 718/102 |
| 2017/0102906 A1* | 4/2017 | Shimomoto | .......... | G06F 3/1275 |
| 2018/0032286 A1* | 2/2018 | Panda | ................ | H04N 1/00244 |
| 2018/0210686 A1* | 7/2018 | Takigawa | ............. | H04N 1/4413 |
| 2018/0374007 A1* | 12/2018 | Hamada | ............. | H04N 1/32117 |
| 2019/0034127 A1* | 1/2019 | Chhabra | ............. | G06F 11/3006 |

\* cited by examiner

INFORMATION PROCESSING SYSTEM UPDATING PRE-FORMATION IMAGE INFORMATION WITH NEW IMAGE INFORMATION, INFORMATION PROCESSING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-109176 filed Jun. 7, 2018.

BACKGROUND

(i) Technical Field

The present disclosure relates to an information processing system, an information processing apparatus, and a non-transitory computer readable medium.

(ii) Related Art

Japanese Unexamined Patent Application Publication No. 2011-204005 discloses an information processing apparatus including: an accepting means for accepting a print job transmitted by a sender; a print performing means for, in a case where the print job accepted by the accepting means is a print job to which authentication information is not attached, performing printing immediately and for, in a case where the print job accepted by the accepting means is an authentication-information-attached print job to which the authentication information is attached, temporarily storing the print job and performing printing on the basis of authentication by a print operator; and a notifying means for, in a case where printing of the authentication-information-attached print job has been performed by the print performing means, notifying the sender transmitting the print job that printing of the print job is completed.

Japanese Unexamined Patent Application Publication No. 2006-107142 discloses a document processing apparatus for creating, from electronic data created by an application program, a document file that includes attribute information and document page data on a per page basis, the document processing apparatus including: a storing means for storing information about an original document used to identify electronic data from which a document file is created, as part of the document file; an update instructing means for giving an instruction for recreating the document file; and an updating means for, in response to the instruction given by the update instructing means, creating new document page data for the document file from the electronic data identified with the information about the original document and replacing document page data included in the document file with the new document page data.

SUMMARY

In recent years, information processing systems that process information in accordance with a processing procedure created in advance have been drawing attention.

Some of the information processing systems perform, in accordance with the processing procedure, a process for, for example, noise reduction and so on for an input image, and thereafter, store the processed image on a print server and distribute the image to a printer in response to an image formation instruction to thereby perform a series of processing for forming the image on a recording medium by the printer.

In such information processing systems, a situation may occur in which a user wants to update the image stored on the print server before the image is formed on a recording medium by the printer because, for example, an error is found in the content of the image.

Aspects of non-limiting embodiments of the present disclosure relate to an information processing system, an information processing apparatus, and a non-transitory computer readable medium that allows an update on an image before the image is formed on a recording medium.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system including an update unit and a management unit. The update unit updates, in a case where a processing procedure relating to image formation is a new processing procedure for pre-formation image information before formation on a recording medium, the pre-formation image information being generated in accordance with a previous processing procedure, the pre-formation image information with new image information that is generated in accordance with the new processing procedure. The management unit includes a distribution section, the distribution section distributing, in a case of accepting, from a recipient that is associated with the new processing procedure, a formation instruction for an image that is associated with the new image information used by the update unit, the image associated with the new image information to an image forming unit, among image forming units, that is operated by the recipient.

BRIEF DESCRIPTION OF THE DRAWINGS

An exemplary embodiment of the present disclosure will be described in detail based on the following figures, wherein.

DETAILED DESCRIPTION

Figure 1:
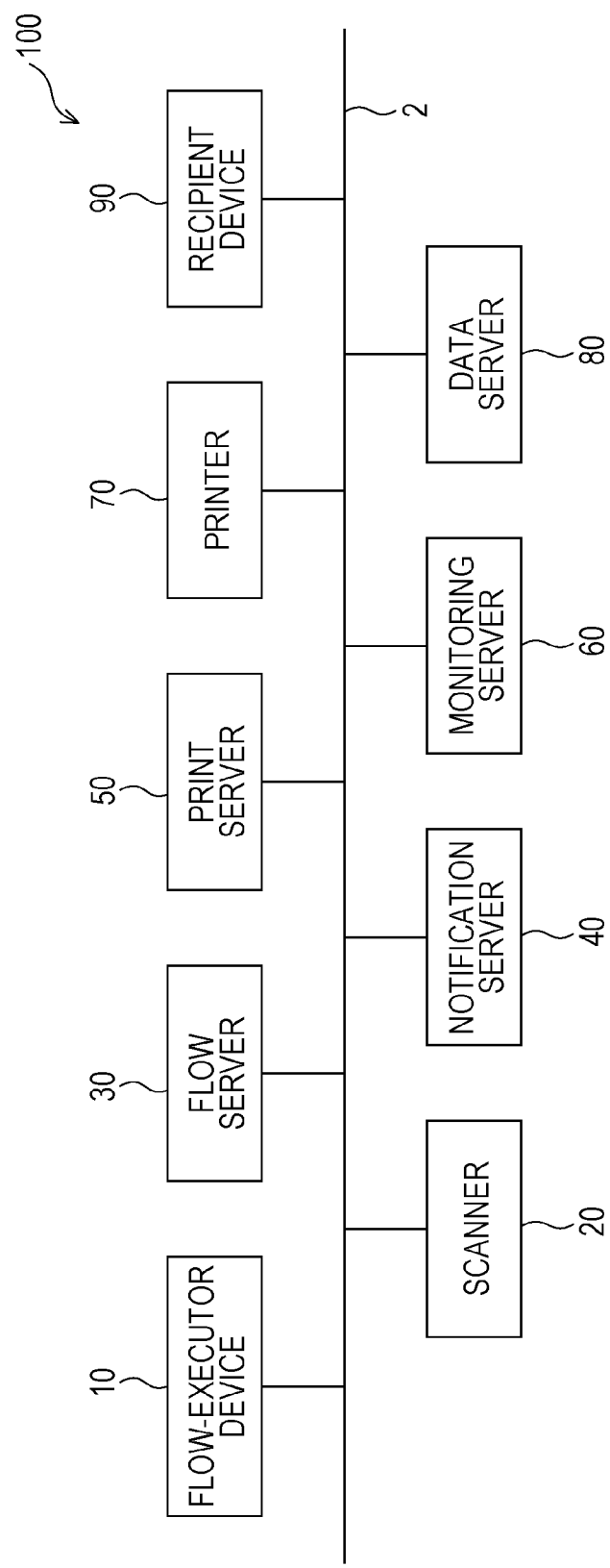
FIG. 1 is a diagram illustrating an example configuration of an information processing system.

Hereinafter, an exemplary embodiment of the present disclosure will be described with reference to the drawings. Note that constituent elements and processes having the same functions are assigned the same reference numerals throughout the drawings, and duplicated descriptions thereof will be omitted.

Exemplary Embodiment

FIG. 1 a diagram illustrating an example configuration of an information processing system 100 according to this exemplary embodiment. As illustrated in FIG. 1, the information processing system 100 includes a flow-executor device 10, a scanner 20, a flow server 30, a notification server 40, a print server 50, a monitoring server 60, a printer 70, a data server 80, and a recipient device 90. The devices and servers are connected to one another via a communication line 2.

The information processing system 100 performs a process for distributing an image generated in accordance with a predetermined processing procedure to the printer 70 in accordance with a formation instruction given by a predetermined image recipient (hereinafter simply referred to as "recipient") and forming the distributed image on a recording medium, such as paper, by using the printer 70.

Specifically, the scanner 20 optically reads the content of a document and generates an image that represents the content of the document. That is, "image" is data that is created in accordance with a predetermined file format and that represents the content of a document. The image includes text and a graphic included in the document, text information including information about the color and font of the text, and arrangement information indicating the positions of the text and graphic in the document.

The flow server 30 accepts settings for a processing procedure including an image forming process using the printer 70 from an executor of the processing procedure. Here, "processing procedure" indicates a flow of a series of processes that is performed for an image, and is also called "flow". Therefore, an executor that operates the flow server 30 to perform a set processing procedure is referred to as "flow executor".

The flow server 30 combines plug-ins that perform processes included in a set flow in accordance with a set order of the processes and performs the processes in accordance with the flow. For example, in a case where the set flow includes a noise reduction process, noise reduction is performed for an image by a noise reduction plug-in, and image information including the image is generated. Image information includes an image and information about the image, and is information that is used in image management in the information processing system 100. Information about an image includes information, such as the name of a flow executor who executes a flow including an image forming process, the name of the recipient, the number of pages in a case where the image is formed on a recording medium, and the name (file name) of the image used to identify the image.

The recipient of the image is set at the time when the flow is set in the flow server 30, at the time when the flow starts, or during a period in which the flow is being performed, and the timing at which the recipient is set is set by the flow executor.

The flow server 30 transmits the image information generated in accordance with the flow to the data server 80 and requests the print server 50 to distribute the image associated with the generated image information.

The data server 80 is an example of a storage device that stores various types of data used in the information processing system 100, and manages data by using, for example, a database. However, a database need not be used in the data server 80, and data needs to be managed so that specified data is retrieved.

The print server 50 is an example of a management unit that manages image information in response to a request from the flow server 30, and includes a distribution section that distributes, to the printer 70, the image associated with the image information in a case of accepting an image formation instruction from the recipient indicated by the image information. In a case of accepting an image formation instruction from a recipient other than the recipient indicated by the image information, the print server 50 does not distribute the image associated with the image information to the printer 70. That is, the print server 50 implements authenticated printing in which image formation on a recording medium is permitted for only a recipient specified in advance in flow setting.

The printer 70 is an example of an image forming unit that forms an image on a recording medium, and transmits an image formation instruction to the print server 50 in accordance with an instruction given by a recipient. The printer 70 includes a reading sensor that reads, for example, identification (ID) information for identifying the recipient, and transmits the ID information read by the reading sensor to the print server 50 together with the image formation instruction to thereby implement authenticated printing.

The printer 70 may use any image forming system and may use, for example, an electrophotographic system or an inkjet system.

The monitoring server 60 is an example of a monitoring unit that, for example, periodically monitors the state of image formation in the printer 70. In a case of detecting completion of image formation in the printer 70, the monitoring server 60 sends a print completion notification to the flow server 30.

In a case of receiving the print completion notification, the flow server 30 sends, to the notification server 40, a receipt notification indicating that the set recipient has received the image, and requests the print server 50 to delete the image information corresponding to the image that has been formed on a recording medium.

The notification server 40 is an example of a notification unit that sends a notification to the recipient and to the flow executor. The notification server 40 includes a notification section that, in a case of receiving the receipt notification from the flow server 30, sends a receipt notification to a device (flow-executor device 10) specified in advance by the flow executor.

In order to allow replacement of image information managed by the print server 50 even after processing has been performed in accordance with a flow, the information processing system 100 includes an update section that accepts an update on the flow by the flow executor during a period before the recipient forms the image associated with the image information to be updated on a recording medium by using the printer 70.

In a case where a flow is updated by the flow server 30, image information generated in accordance with the pre-update flow is updated with image information generated in accordance with the new flow. As described above, the flow server 30 is an example of an update unit according to this exemplary embodiment.

The pre-update flow is an example of "previous processing procedure", and the new flow with which image information generated in accordance with the pre-update flow is updated is an example of "new processing procedure". The image information generated in accordance with the pre-update flow before the image is formed by the printer 70 is an example of "pre-formation image information", and the image information generated in accordance with the new flow is an example of "post-update image information".

The notification server 40 may receive, in addition to a receipt notification, an update notification from the flow server 30 in a case where the flow executor updates a flow by using the flow server 30. In a case of receiving an update notification from the flow server 30, the notification server 40 sends an update notification to a device (recipient device 90) specified in advance by the recipient.

The flow-executor device 10 is a device that receives an image receipt notification sent in response to the recipient forming the image on a recording medium by using the printer 70.

The recipient device 90 is a device that receives an update notification sent in response to the flow executor updating the pre-formation image information with the post-update image information.

The flow-executor device 10 and the recipient device 90 may be any devices as long as the devices receive a receipt notification and an update notification, respectively. However, from the viewpoint of readiness for notifications, devices carried by the flow executor and the recipient, such as smartphones or wearable devices, are more desirable than, for examples, computers installed at predetermined locations, such as houses or offices.

The communication line 2 for connecting the devices and servers included in the information processing system 100 may be a radio link or a wire line and may be a dedicated line or a public line to which a large number of unspecified devices are connected. Hereinafter, the devices and servers included in the information processing system 100 are referred to as "devices included in the information processing system 100".

In the example illustrated in FIG. 1, the scanner 20 is included in the information processing system 100; however, the scanner 20 need not be included in the information processing system 100. For example, the flow server 30 may read an image stored in advance in a semiconductor memory, such as a universal serial bus (USB) memory or a memory card, and process the image in accordance with a set flow. For example, facsimile data received by a facsimile device not illustrated may be temporarily stored on the data server 80, and the flow server 30 may read the facsimile data stored on the data server 80 as an image.

The data server 80 need not be included in the information processing system 100 and, for example, a storage device included in the print server 50 may be used instead of the data server 80.

In the example illustrated in FIG. 1, the information processing system 100 includes one device for each type of device; however, the information processing system 100 may include any number of devices for each type of device. For example, in a case where a plurality of printers 70 are present, the monitoring server 60 monitors the state of image formation in each of the printers 70 and sends a print completion notification to the flow server 30. In a case where a plurality of flow-executor devices 10 are specified, the notification server 40 sends a receipt notification to each of the flow-executor devices 10. In a case where a plurality of recipient devices 90 are specified, the notification server 40 sends an update notification to each of the recipient devices 90.

Now, an example configuration of a basic part of an electrical system in the devices included in the information processing system 100 is described with reference to FIG. 2.

Figure 2:
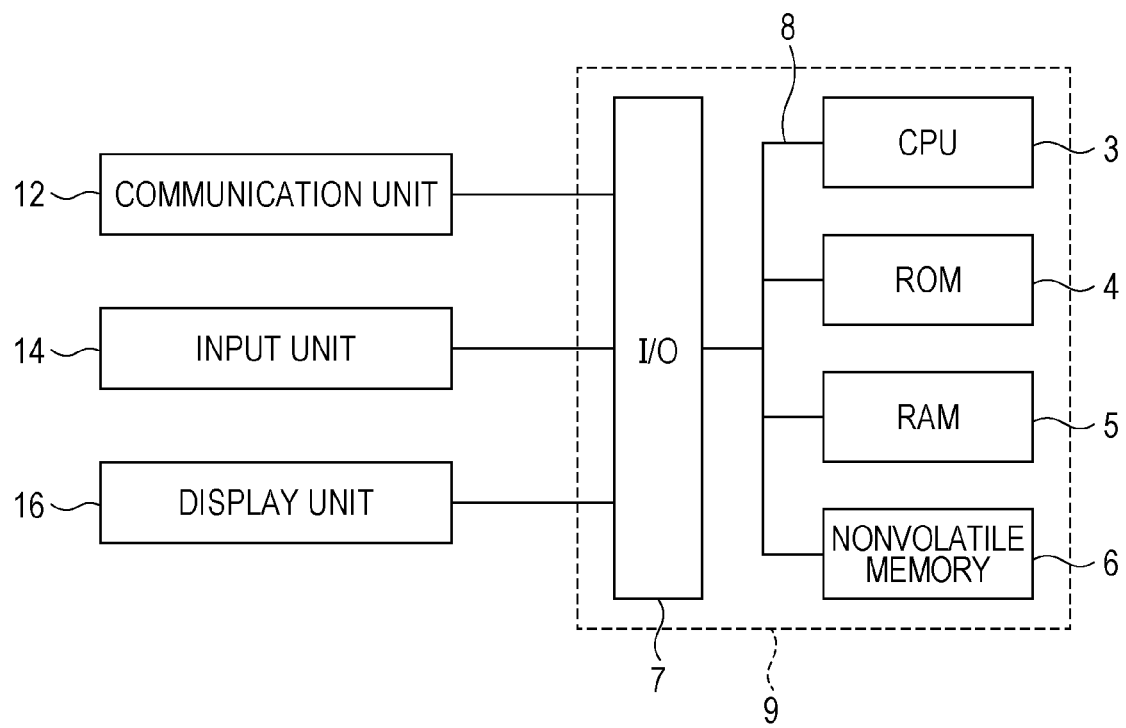
FIG. 2 is a diagram illustrating an example configuration of a basic part of an electrical system in devices included in the information processing system.

As illustrated in FIG. 2, each of the devices included in the information processing system 100 is constituted by, for example, a computer 9.

The computer 9 includes a central processing unit (CPU) 3, a read-only memory (ROM) 4 that stores a program executed by the CPU 3, a random access memory (RAM) 5 that is used as a temporary work area for the CPU 3, a nonvolatile memory 6, and an input/output interface (I/O) 7. The CPU 3, the ROM 4, the RAM 5, the nonvolatile memory 6, and the I/O 7 are connected to one another via a bus 8.

The nonvolatile memory 6 is an example of a storage device that retains stored data even if power supplied to the nonvolatile memory 6 is shut off. As the nonvolatile memory 6, for example, a semiconductor memory is used; however, a hard disk may be used.

To the I/O 7, for example, a communication unit 12, an input unit 14, and a display unit 16 are connected.

The communication unit 12 is connected to the communication line 2 and has a communication protocol for transmitting/receiving data to/from the devices included in the information processing system 100.

The input unit 14 is an input device for accepting an instruction given by an operation and communicating the instruction to the CPU 3. As the input unit 14, for example, buttons, a touch panel, a keyboard, and a mouse are used.

The display unit 16 is a display device that displays information processed by the CPU 3 as an image. As the display unit 16, for example, a liquid crystal display or an organic electroluminescent (EL) display is used.

To the I/O 7 of the computer 9 that constitutes the scanner 20, for example, a scan unit (not illustrated) that optically reads the content of a document placed on a platen glass and converts the content of the document to an image in accordance with an instruction from the CPU 3 is connected. To the I/O 7 of the computer 9 that constitutes the printer 70, an image formation unit (not illustrated) that forms an accepted image on a recording medium in accordance with an instruction from the CPU 3 is connected.

Now, a process that is performed in the flow server 30 is described in detail with reference to FIG. 3.

Figure 3:
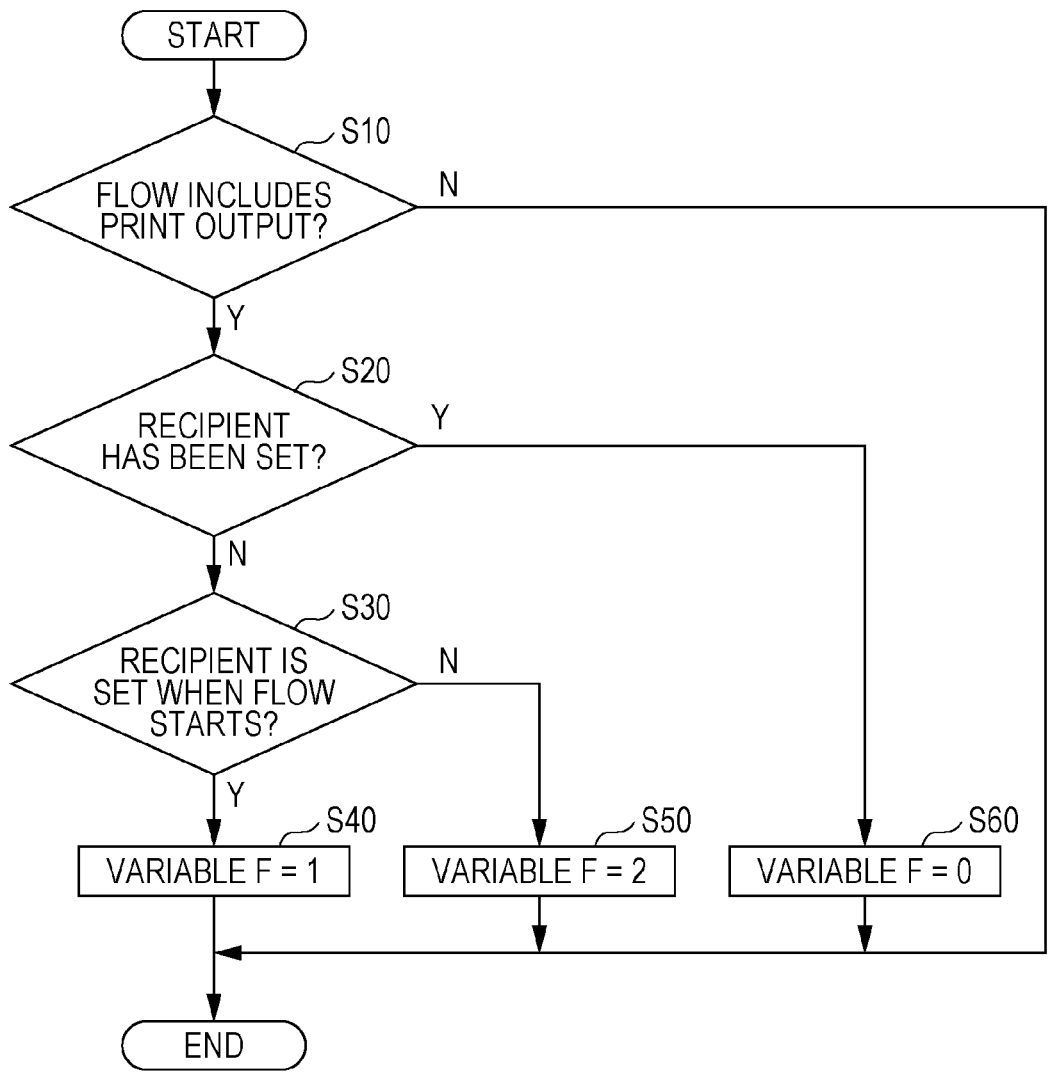
FIG. 3 is a flowchart illustrating an example course of a flow setting process.

FIG. 3 is a flowchart illustrating an example course of a flow setting process that is performed by the CPU 3 of the flow server 30 in a case where a flow executor sets a flow by using the flow server 30.

A flow is set by a flow executor inputting, to the flow server 30, a flow definition that defines, for example, processes to be performed in the flow, parameter values used in the processes, and the order of the processes. The flow setting process illustrated in FIG. 3 is an example flow setting process for setting the recipient in the flow setting.

An information processing program that defines the flow setting process is stored in advance in, for example, the ROM 4 of the flow server 30. The CPU 3 of the flow server 30 reads the information processing program stored in the ROM 4 and performs the flow setting process.

It is assumed that, in the flow setting, the attribute value of "perform recipient setting" is set in advance to "yes". In a case where "perform recipient setting" is set to "yes", a flow that corresponds to authenticated printing is set. On the other hand, in a case where "perform recipient setting" is set to "no", a flow that corresponds to direct printing is set. The direct printing is an operation in which, even if an image formation instruction from the recipient is not given, when the print server 50 accepts an image distribution request from the flow server 30, the print server 50 distributes an image generated in accordance with the flow to the printer 70 that is specified in advance to form the image on a recording medium.

It is further assumed that an image that is passed to the recipient is specified by the flow executor in the flow setting.

First, in step S10, the CPU 3 of the flow server 30 determines whether the flow under setting is a flow that includes image formation using the printer 70. Specifically, the CPU 3 determines whether a process for requesting the print server 50 to distribute the image is included in the flow. If the process for requesting the print server 50 to distribute the image is included, the CPU 3 determines that the flow under setting is a flow that includes image formation using the printer 70.

If a process relating to image formation is not included in the flow under setting (N in step S10), no image is formed by the printer 70, and therefore, the flow setting process relating to image recipient setting need not be performed. Therefore, the flow setting process illustrated in FIG. 3 ends.

On the other hand, if a process relating to image formation is included in the flow under setting (Y in step S10), the process proceeds to step S20. Hereinafter, "CPU 3" indicates the CPU 3 of the flow server 30 unless otherwise noted.

In step S20, the CPU 3 determines whether the image recipient has already been set. In a case where the flow executor sets the attribute value of "perform recipient setting" to "yes", an input field for setting the recipient is enabled. In a case where the recipient has already been determined at the flow setting stage, the flow executor might set the recipient before the start of the flow setting process illustrated in FIG. 3.

In a case where the recipient has already been determined at the flow setting stage (Y in step S20), the recipient need not be set in the subsequent stage, and therefore, the process proceeds to step S60. In step S60, the CPU 3 sets a variable F to "0", and the flow setting process illustrated in FIG. 3 ends. The variable F is a variable that represents the state of recipient setting and is stored in, for example, the RAM 5. The case where the variable F is set to "0" indicates that the recipient has already been set at the flow setting stage.

A description is given here under the assumption that the flow executor and the recipient are different persons; however, the flow executor may be a recipient among a plurality of recipients.

On the other hand, if it is determined in the determination process in step S20 that the recipient has not been set at the flow setting stage (N in step S20), the process proceeds to step S30.

In step S30, the CPU 3 displays, on the display unit 16 of the flow server 30, a setting screen for accepting a setting as to whether the recipient is set at a stage at which an instruction for starting the flow under setting is accepted from the flow executor (flow start stage). If the flow executor performs setting so that the recipient is set at the flow start stage (Y in step S30), the process proceeds to step S40. In step S40, the CPU 3 sets the variable F to "1", and the flow setting process illustrated in FIG. 3 ends. The case where the variable F is set to "1" indicates that the recipient has not been set at the flow setting stage but is set by the flow executor at the flow start stage.

If the flow executor performs setting so that the recipient is not set even at the flow start stage (N in step S30), the process proceeds to step S50. In step S50, the CPU 3 sets the variable F to "2", and the flow setting process illustrated in FIG. 3 ends. The case where the variable F is set to "2" indicates that the CPU 3 reads the content of the image in a stage after the start of an image processing flow (flow execution stage) and sets the recipient. More specifically, the CPU 3 reads the content of the image and sets the recipient after the start of the flow and before the image that is associated with image information generated in accordance with the flow is formed on a recording medium by the printer 70.

Accordingly, the method for setting the recipient for the flow under setting is determined.

Now, a flow process for executing a set flow is described.

Figure 4:
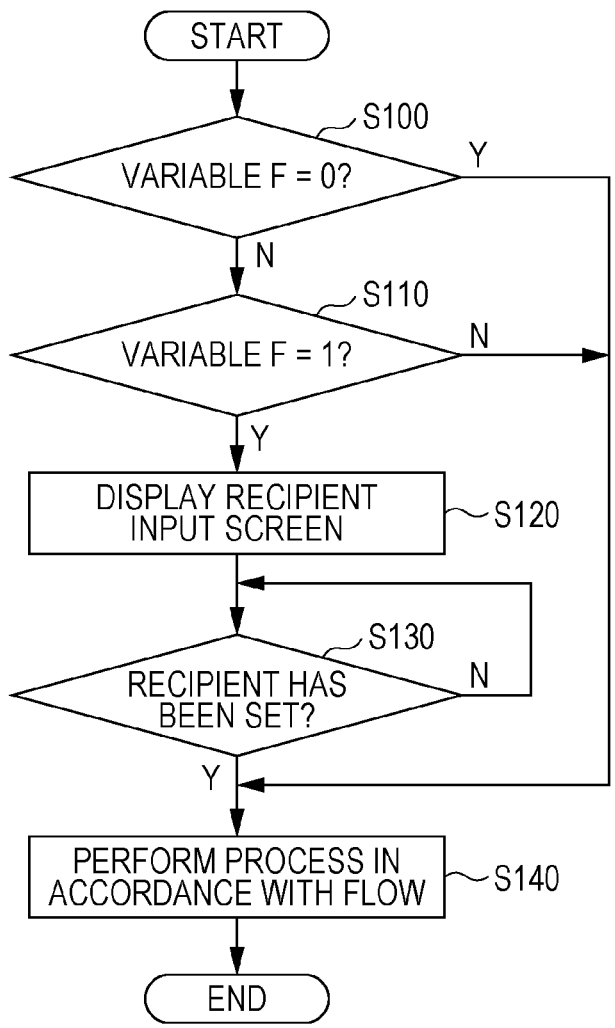
FIG. 4 is a flowchart illustrating an example course of a flow process.

FIG. 4 is a flowchart illustrating an example course of the flow process that is performed by the CPU 3 in a case where the flow executor executes a set flow by using the flow server 30.

An information processing program that defines the flow process is stored in advance in, for example, the ROM 4 of the flow server 30. The CPU 3 reads the information processing program stored in the ROM 4 and performs the flow process.

In step S100, the CPU 3 obtains the variable F set in the flow setting process illustrated in FIG. 3 from the RAM 5 and determines whether the variable F is equal to "0". If the variable F is equal to "0" (Y in step S100), the recipient has already been set at the flow setting stage, and therefore, the process proceeds to step S140. In step S140 described below, a process is performed in accordance with the flow.

If it is determined in the determination process in step S100 that the variable F is not equal to "0" (N in step S100), the process proceeds to step S110.

In step S110, the CPU 3 determines whether the variable F is equal to "1". If the variable F is not equal to "1" (N in step S110), the variable F is equal to "2". Therefore, the CPU 3 needs to read the content of the image and set the recipient in the flow execution stage. Accordingly, the process proceeds to step S140. In step S140 described below, the recipient is set while a process is performed in accordance with the flow.

On the other hand, if it is determined in the determination process in step S110 that the variable F is equal to "1" (Y in step S110), the flow executor needs to set the recipient at the flow start stage. Therefore, the process proceeds to step S120.

In step S120, the CPU 3 displays, on the display unit 16 of the flow server 30, a recipient input screen for accepting a recipient setting. The flow executor inputs a recipient on the displayed recipient input screen to set the recipient for the flow for which an execution instruction has been given.

In step S130, the CPU 3 determines whether the recipient has been set. If the recipient has not been set (N in step S130), the CPU 3 repeatedly performs the process in step S130 to monitor input of a recipient. On the other hand, if the recipient has been set (Y in step S130), the recipient has been set at the flow start stage, and therefore, the process proceeds to step S140.

In step S140, the CPU 3 generates image information in accordance with the set flow, transmits the generated image information to the data server 80, and requests the print server 50 to distribute the image associated with the generated image information.

If the variable F is equal to "2", the CPU 3 needs to set the recipient from the image that is processed in accordance with the flow. Therefore, the CPU 3 uses a publicly available image processing technique to read identification information of an individual included in a predetermined area of the image and sets a person indicated by the identification information as the recipient.

Examples of the identification information of an individual include the name of the individual included in an area labeled "recipients for distribution" and ID information uniquely assigned to the individual. The name of the individual and the ID information may be expressed by characters or a barcode. Accordingly, in the case where the variable F is equal to "2", the recipient is set in the flow execution stage, and authenticated printing is performed for the set recipient.

The process performed in accordance with the flow includes a process relating to image capturing, image processing and determination, and image distribution. As the image processing and determination, a process that is set in the flow among, for example, a rotation process, an enlarging/reducing process, a noise reduction process, and a blank paper determination process for the image is performed.

A situation may occur in which, after the flow has been executed, the flow executor wants to distribute a new corrected image to the recipient because, for example, the flow executor finds an error. In this case, the information processing system 100 according to this exemplary embodiment needs to perform an update process for replacing image information that corresponds to a pre-formation image with new image information.

Figure 5:
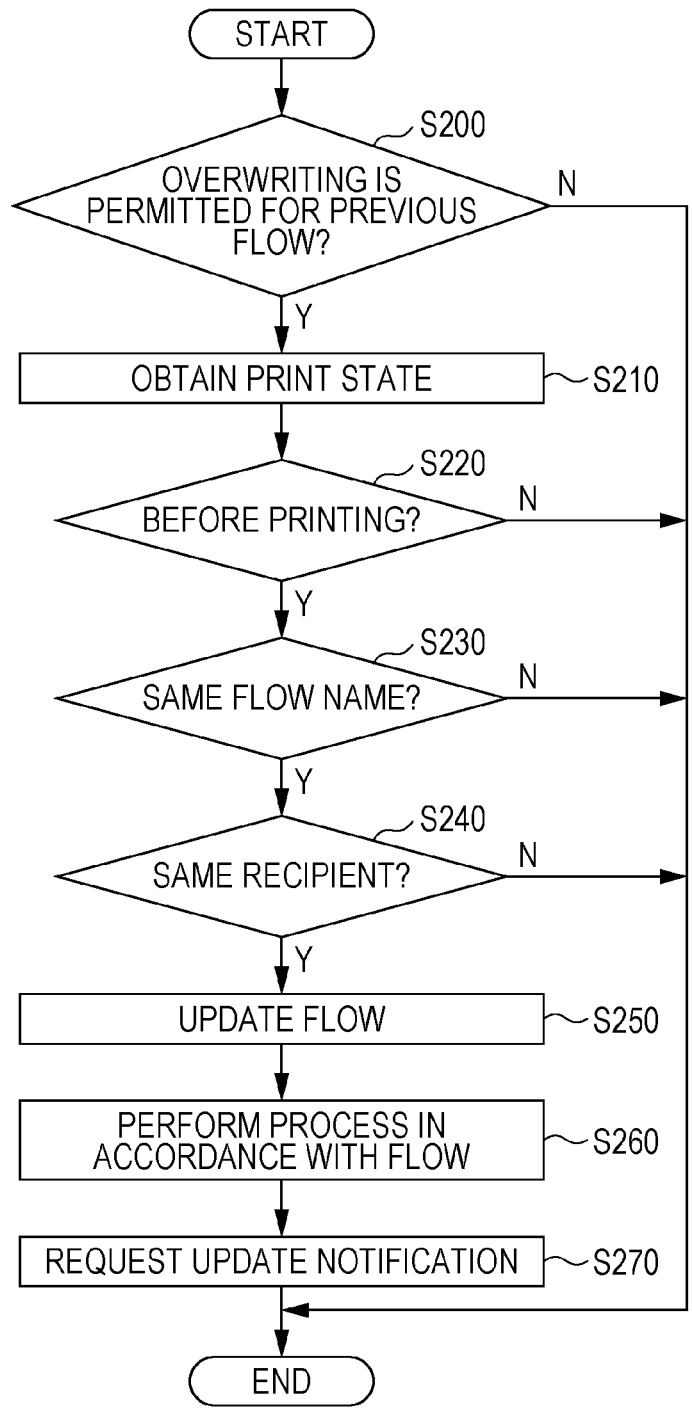
FIG. 5 is a flowchart illustrating an example course of an update process.

FIG. 5 is a flowchart illustrating an example course of an update process for image information that is performed by the CPU 3 at the flow setting stage in a case where a new flow for a flow with which the image information to be updated has been generated is accepted.

An information processing program that defines the update process is stored in advance in, for example, the ROM 4 of the flow server 30. The CPU 3 reads the information processing program stored in the ROM 4 and performs the update process.

In step S200, the CPU 3 determines whether flow overwriting permission is set to "yes" at the time when the flow with which image information to be updated is generated, that is, the pre-update flow, is set.

The flow overwriting permission indicates whether to permit an operation of, during a period after the start of the flow and before an image associated with image information generated in accordance with the flow is formed on a recording medium by the printer 70, updating the flow and replacing the image information generated in accordance with the pre-update flow with image information generated in accordance with the new post-update flow. If the flow overwriting permission is set to "no" (N in step S200), an update on the flow is not permitted. Therefore, an update on the image information generated in accordance with the flow is not permitted. Accordingly, in this case, the update process illustrated in FIG. 5 ends, and another flow is set after the end of the update process to thereby distribute the updated image to the recipient. That is, the recipient receives two images, namely, the pre-update image and the post-update image.

On the other hand, if the flow overwriting permission is set to "yes" (Y in step S200), an update on the flow is permitted. Therefore, the process proceeds to step S210.

In step S210, the CPU 3 obtains, from the print server 50, the print state of the image associated with the image information generated in accordance with the pre-update flow. The print state of an image indicates whether the image has been formed on a recording medium by the printer 70 in accordance with an image formation instruction given by the recipient.

In step S220, the CPU 3 determines whether the print state obtained in step S210 is a pre-image-formation state. If the print state indicates that the image has been formed (N in step S220), that is, the image information has been deleted from the data server 80, it is not possible to update the image information. Therefore, the update process illustrated in FIG. 5 ends. In this case, another flow is set after the end of the update process to thereby distribute the post-update image to the recipient as in the case where the flow overwriting permission is set to "no".

On the other hand, if the print state is a pre-image-formation state (Y in step S220), the image information has not been deleted and remains stored on the data server 80, and therefore, it is possible to update the image information. Accordingly, the process proceeds to step S230.

In step S230, the CPU 3 determines whether the flow under setting is the new flow for the pre-update flow. Specifically, in a case where a flow name that is input when the pre-update flow is set and the flow name of the flow under setting are the same, the CPU 3 recognizes the flow under setting as the new flow for the pre-update flow having the same flow name. Flows having the same name are defined as "the same flows".

If it is determined that the flow under setting is not the new flow for the pre-update flow (N in step S230), the flow under setting is not a flow with which the image information generated in accordance with the pre-update flow is updated, and therefore, the update process illustrated in FIG. 5 ends.

On the other hand, if it is determined that the flow under setting is the new flow for the pre-update flow (Y in step S230), the flow under setting is a flow with which the image information generated in accordance with the pre-update flow is updated, and therefore, the process proceeds to step S240.

In step S240, the CPU 3 determines whether the recipient set in the flow under setting is the same as the recipient set in the pre-update flow. In a case where a plurality of recipients are set in the pre-update flow, if recipients set in the flow under setting are the same as the respective recipients set in the pre-update flow, the CPU 3 determines that the recipients are the same.

If it is determined that the recipient differs between the pre-update flow and the flow under setting (N in step S240), the flow under setting is not a flow with which the image information is updated, and therefore, the update process illustrated in FIG. 5 ends.

On the other hand, if it is determined that the recipient set in the pre-update flow and the recipient set in the flow under setting are the same (Y in step S240), the process proceeds to step S250.

The flow under setting satisfies the update conditions imposed in steps S230 and S240, and therefore, the CPU 3 updates the pre-update flow with the flow under setting, that is, the new flow, in step S250.

In step S260, the CPU 3 performs a process for the input image in accordance with the new flow updated in step S250. Accordingly, image information processed in accordance with the new flow is generated, and the pre-formation image information stored on the data server 80 is updated with the post-update image information.

Further, the CPU 3 notifies the notification server 40 that the pre-formation image information has been updated with the post-update image information.

In step S270, the CPU 3 transmits, to the notification server 40, an instruction for sending an update notification for notifying each recipient set in the new flow of the update on the image information to request the notification server 40 to send the update notification. Specifically, the CPU 3 transmits, to the notification server 40, the mail address of the recipient device 90 specified by the recipient set in the new flow and the file name of the image that is associated with the updated image information to request sending of the update notification.

When accepting the request for update notification, the notification server 40 transmits a mail that is addressed to the mail address of the recipient device 90 transmitted from the CPU 3 and that includes the file name of the updated image, the time of update, and so on. Accordingly, the recipient who receives the update notification by the recipient device 90 knows that the image has been updated.

In a case where a plurality of recipients are set in the new flow, and at least one of the recipients has not formed the image on a recording medium by using the printer 70, the update notification is sent also to a recipient who has already formed the pre-update image on a recording medium by using the printer 70. In this case, the recipient who has received the pre-update image needs to operate the printer 70 again and receive the post-update image. Consequently, the update process illustrated in FIG. 5 ends.

In a case where a plurality of recipients are set and all of the recipients have not form the image by using the printer 70, the image information remains stored on the data server 80. Therefore, if at least one of the recipients has not formed the image although the other recipients have formed the image by using the printer 70, it is determined that the print state is a pre-image-formation state.

The process in which a flow is set and updated in the flow server 30, image information generated in accordance with the flow process is stored on the data server 80, and management of the image information is requested to the print server 50 has been described so far. Hereinafter, a process that is performed in the information processing system 100 after authenticated printing has been performed by the printer 70 will be described.

Figure 6:
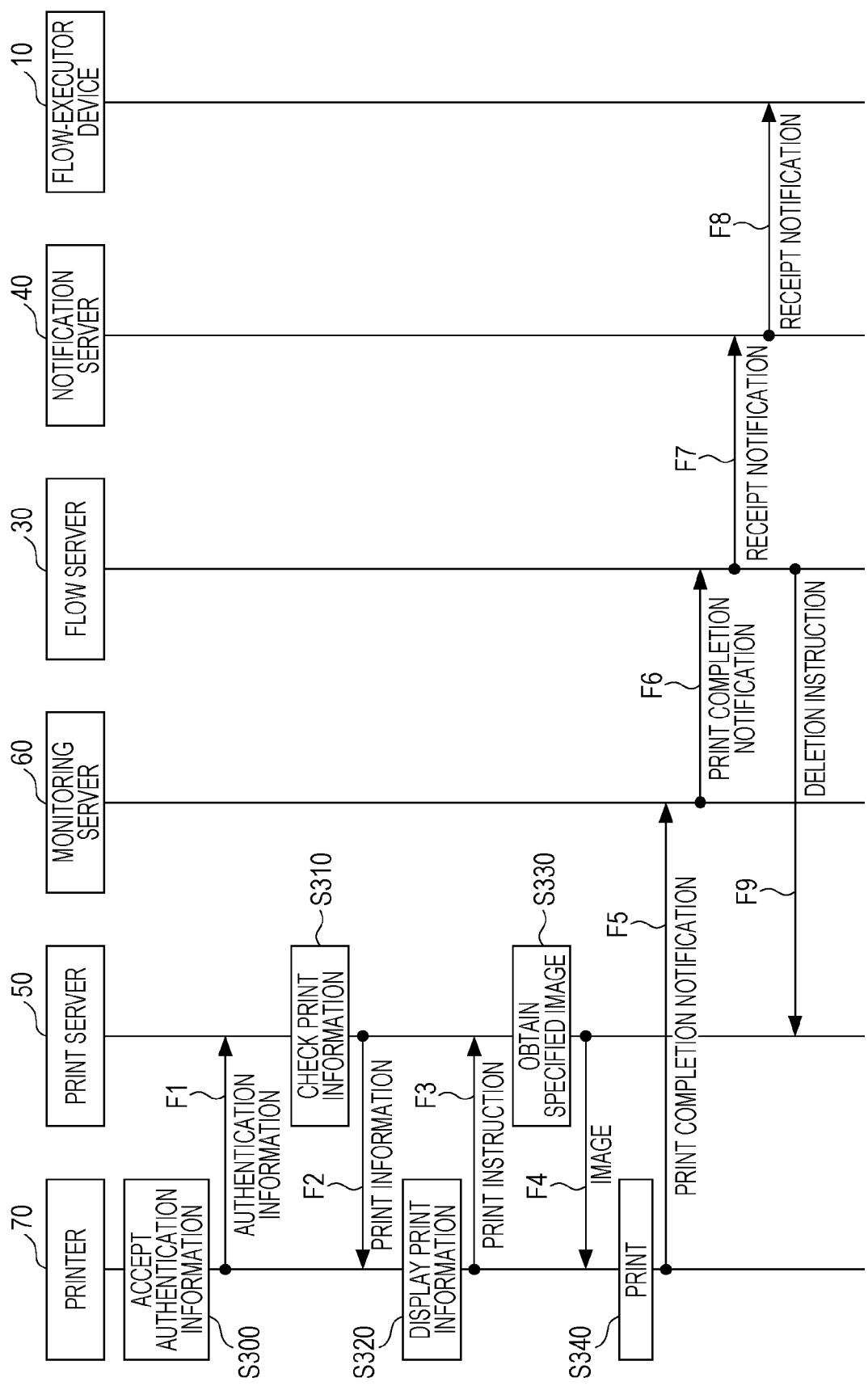
FIG. 6 is a sequence chart illustrating an example course of a process that is performed after authenticated printing.

FIG. 6 is a sequence chart illustrating an example course of a process that is performed in the information processing system 100 after authenticated printing has been performed by the printer 70.

As illustrated in FIG. 6, when the printer 70 accepts, from a recipient, authentication information, such as ID information, for identifying the recipient (S300), the printer 70 transmits the authentication information to the print server 50 (see F1).

When accepting the authentication information, the print server 50 checks to see if a piece of image information with which the recipient indicated by the authentication information is associated is present among pieces of image information managed by the print server 50 (S310). If such a piece of image information is present, the print server 50 transmits print information to the printer 70 that has transmitted the authentication information (see F2). The print information includes, for example, the file name of an image that is associated with the piece of image information, the acceptance time of the piece of image information, and so on.

When accepting the print information, the printer 70 displays the print information on the display unit 16 of the printer 70 (S320) to indicate that an image addressed to the recipient is present.

In response to this, the recipient operates the input unit 14 of the printer 70 to send a print instruction for the image to the print server 50 (see F3).

When accepting the print instruction, the print server 50 obtains the specified image from the data server 80 (S330) and transmits the obtained image to the printer 70 that has transmitted the print instruction (see F4).

When accepting the image addressed to the recipient, the printer 70 forms the image on a recording medium (S340) and sends a print completion notification indicating that image formation is completed to the monitoring server 60 together with the ID information of the recipient (see F5). In this example, a notification indicating that image formation is completed is sent from the printer 70; however, the monitoring server 60 may monitor the state of image formation in the printer 70 at predetermined intervals and detect completion of image formation in the printer 70 together with the ID information of the recipient who has received the image.

When detecting completion of image formation in the printer 70, the monitoring server 60 sends a print completion notification to the flow server 30 (see F6). The print completion notification includes, for example, the file name of the image received by the recipient and the ID information of the recipient who has received the image.

When receiving the print completion notification, the flow server 30 sends a receipt notification indicating that the recipient has received the image to the notification server 40 (see F7). The receipt notification includes, for example, the file name of the image that has been received and the mail address of the flow-executor device 10 specified by the flow executor for the flow with which image information for the image that has been received has been generated.

When receiving the receipt notification, the notification server 40 sends a receipt notification addressed to the mail address included in the received receipt notification (see F8). Accordingly, the flow executor who has received the receipt notification by the flow-executor device 10 knows that image distribution is completed.

Further, when receiving the print completion notification from the monitoring server 60, the flow server 30 transmits a deletion instruction for deleting the image information corresponding to the image received by the recipient to the print server 50 (see F9).

When accepting the deletion instruction, the print server 50 deletes the image information specified in the deletion instruction from the data server 80.

In a case where a plurality of recipients are present for an image for which receipt is completed, the flow server 30 sends a receipt notification and a deletion instruction to the notification server 40 and to the print server 50, respectively, after a print completion notification has been received from every set recipient.

Consequently, authenticated printing in the information processing system 100 ends.

As described above, in the information processing system 100 according to this exemplary embodiment, even image information generated in accordance with a flow that has already been executed is updated in accordance with a new flow if an image associated with the image information has not been formed on a recording medium by the recipient.

Modification

In the update process for image information illustrated in FIG. 5, image information is updated in a case where the update conditions that the pre-update flow and the post-update flow are the same flows and that the image recipient in the pre-update flow and the image recipient in the post-update flow are the same are satisfied. The update process for image information includes a process for deleting the pre-update image information, and therefore, it is desirable to determine, from many viewpoints, whether the image information may be updated.

Figure 7:
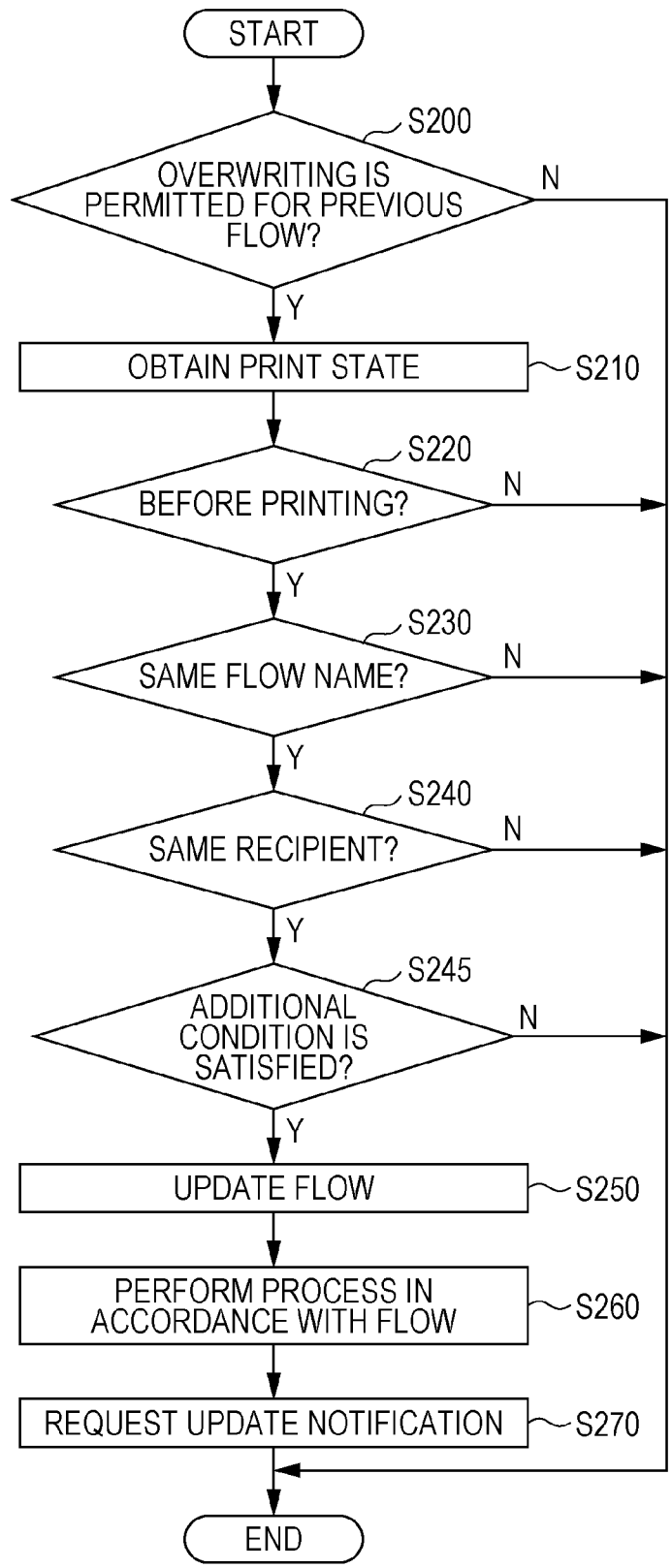
FIG. 7 is a flowchart illustrating another example of the update process.

FIG. 7 is a flowchart illustrating an example course of the update process for image information that is performed by the CPU 3 at the flow setting stage.

The update process illustrated in FIG. 7 is different from the update process illustrated in FIG. 5 in that step S245 is added. The remaining process in FIG. 7 is the same as the update process illustrated in FIG. 5.

After it has been determined that the pre-update flow and the post-update flow are the same flows in step S230 and it has been determined that the image recipient in the pre-update flow and the image recipient in the post-update flow are the same in step S240, step S245 is performed.

In step S245, the CPU 3 determines whether the attributes of an image input to the pre-update flow and the attributes of an image input to the new flow satisfy an additional condition for permitting an update on the image information. The attributes of an image correspond to an indicator that indicates the characteristics of the image.

Specifically, in a case of updating image information, the file name of an image that is associated with the image information to be updated is to be the same. Therefore, in a case where the file name of an image that is input to the pre-update flow and the file name of an image that is input to the new flow are the same, the CPU 3 determines that the additional condition is satisfied.

The additional condition for which determination is performed in step S245 is not limited to this, and it may be determined whether another condition for permitting an update on the image information is satisfied.

For example, in a case where a correction is made to an image that is input to a flow, the creation date and time of the image is set to the date and time when the correction is made. Therefore, the creation date and time of the image that is input to the new flow in order to distribute the post-correction image is set to a date and time later than the creation date and time of the image that is input to the pre-update flow. Accordingly, in a case where the creation date and time of the image that is input to the new flow is later than the creation date and time of the image that is input to the pre-update flow, the CPU 3 may determine that the additional condition is satisfied.

Further, determination of an additional condition that the image creator is the same or determination of an additional condition that the edit time of the image (the time taken to create the image) that is input to the new flow is longer than the edit time of the image that is input to the pre-update flow may be added depending on the situation.

As illustrated in FIG. 1, the information processing system 100 according to this exemplary embodiment processes a flow by using the plurality of servers; however, the configuration of the information processing system 100 is not limited to this configuration. For example, the information processing system 100 may be configured so that the processes performed by the flow server 30, the notification server 40, the print server 50, the monitoring server 60, and the data server 80 may be performed by one information processing apparatus. In this case, a processing unit that executes the functions of the flow server 30 corresponds to the update unit, and a processing unit that executes the functions of the print server 50 corresponds to the management unit.

The present disclosure has been described with reference to the exemplary embodiment; however, the present disclosure is not limited to the scope described in the exemplary embodiment. Various modifications or alternations may be made to the exemplary embodiment without departing from the spirit of the present disclosure, and the modified or altered exemplary embodiment also falls within the technical scope of the present disclosure. For example, the order of processes may be changed without departing from the spirit of the present disclosure.

In the exemplary embodiment, for example, the form has been described in which the processes illustrated in FIG. 3 to FIG. 5 and FIG. 7 are implemented as software; however, processes equivalent to those in the flowcharts illustrated in FIG. 3 to FIG. 5 and FIG. 7 may be implemented as, for example, an application-specific integrated circuit (ASIC) so as to be processed by hardware. In this case, processing is performed faster than in the case of implementing the processes as software.

In the exemplary embodiment described above, the form has been described in which the information processing program is installed in the ROM 4; however, this form is not restrictive. The information processing program according to the exemplary embodiment of the present disclosure may be recorded to a computer-readable recording medium and provided. For example, the information processing program according to the exemplary embodiment of the present disclosure may be recorded to an optical disk, such as compact disc (CD)-ROM or a digital versatile disc (DVD)-ROM, and provided. Alternatively, the information processing program according to the exemplary embodiment of the present disclosure may be recorded to a semiconductor memory, such as a USB memory or a flash memory, and provided. Further, each device included in the information processing system 100 may obtain the program via the communication line 2.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing system comprising:
   an update processor that updates, in a case where a processing procedure relating to image formation is a new processing procedure for pre-formation image information before formation on a recording medium, the pre-formation image information being generated in accordance with a previous processing procedure, the pre-formation image information with new image information that is generated in accordance with the new processing procedure; and
   a management processor that includes a distribution section, the distribution section distributing, in a case of accepting, from a recipient that is associated with the new processing procedure, a formation instruction for an image that is associated with the new image information used by the update processor, the image associated with the new image information to an image forming processor, among image forming processors, that is operated by the recipient, wherein
   in a case where an update condition that the new processing procedure and the previous processing procedure are the same and that the recipient associated with the new processing procedure and a recipient that is associated with the previous processing procedure are the same is satisfied, the update processor updates the pre-formation image information with the new image information.

2. The information processing system according to claim 1, wherein
in a case where the update condition is satisfied and where an attribute of an image that is input to the previous processing procedure and an attribute of an image that is input to the new processing procedure satisfy a preset additional condition, the update processor updates the pre-formation image information with the new image information.

3. The information processing system according to claim 2, wherein
the attribute of the image input to the previous processing procedure is a file name of the image input to the previous processing procedure, and the attribute of the image input to the new processing procedure is a file name of the image input to the new processing procedure, and
in a case where the file name of the image input to the previous processing procedure and the file name of the image input to the new processing procedure are the same, the update processor updates the pre-formation image information with the new image information.

4. The information processing system according to claim 2, wherein
the attribute of the image input to the previous processing procedure is a creation date and time of the image input to the previous processing procedure, and the attribute of the image input to the new processing procedure is a creation date and time of the image input to the new processing procedure, and
in a case where the creation date and time of the image input to the new processing procedure is later than the creation date and time of the image input to the previous processing procedure, the update processor updates the pre-formation image information with the new image information.

5. The information processing system according to claim 3, wherein
the attribute of the image input to the previous processing procedure is a creation date and time of the image input to the previous processing procedure, and the attribute of the image input to the new processing procedure is a creation date and time of the image input to the new processing procedure, and
in a case where the creation date and time of the image input to the new processing procedure is later than the creation date and time of the image input to the previous processing procedure, the update processor updates the pre-formation image information with the new image information.

6. The information processing system according to claim 1, further comprising
a notification processor that includes a notification section, the notification section sending a notification to the recipient in a case where the update processor updates the pre-formation image information with the new image information.

7. The information processing system according to claim 1, further comprising
a notification processor that includes a notification section, the notification section sending a notification to the recipient in a case where the update processor updates the pre-formation image information with the new image information.

8. The information processing system according to claim 2, further comprising
a notification processor that includes a notification section, the notification section sending a notification to the recipient in a case where the update processor updates the pre-formation image information with the new image information.

9. The information processing system according to claim 3, further comprising
a notification processor that includes a notification section, the notification section sending a notification to the recipient in a case where the update processor updates the pre-formation image information with the new image information.

10. The information processing system according to claim 4, further comprising
a notification processor that includes a notification section, the notification section sending a notification to the recipient in a case where the update processor updates the pre-formation image information with the new image information.

11. The information processing system according to claim 5, further comprising
a notification processor that includes a notification section, the notification section sending a notification to the recipient in a case where the update processor updates the pre-formation image information with the new image information.

12. The information processing system according to claim 6, further comprising
a monitoring processor that monitors a state of age formation in at least one of the image forming processors, wherein
in a case where the monitoring processor detects the recipient forming the image associated with the new image information on a recording medium by using any of the image forming processors,
the update processor instructs the notification processor to send, to a device specified in the new processing procedure, a receipt notification indicating that the recipient has received the image associated with the new image information.

13. The information processing system according to claim 12, wherein
in a case where the recipient is one of a plurality of recipients that are set for the image associated with the new image information,
in a case where the monitoring processor detects each of the set recipients forming the image associated with the new image information on a recording medium by using any of the image forming processors, the update processor instructs the notification processor to send the receipt notification to devices specified in the new processing procedure.

14. The information processing system according to claim 1, wherein
the update processor includes a setting section, the setting section setting, in a case where the recipient is not specified even after a start of the new processing procedure, the recipient from content of the image associated with the new image information before the image associated with the new image information is formed on a recording medium by using the image forming processor.

15. The information processing system according to claim 14, wherein
the update processor sets a person indicated by individual identification information included in a predetermined area of the image associated with the new image information as the recipient.

16. A non-transitory computer readable medium storing an information processing program causing a computer to function as the processors of the information processing system according to claim 1.

17. An information processing apparatus comprising:
an update processor that updates, in a case where a processing procedure relating to image formation is a new processing procedure for pre-formation image information before formation on a recording medium, the pre-formation image information being generated in accordance with a previous processing procedure, the pre-formation image information with new image information that is generated in accordance with the new processing procedure; and
a management processor that includes a distribution section, the distribution section distributing, in a case of accepting, from a recipient that is associated with the new processing procedure, a formation instruction for an image that is associated with the new image information used by the update processor, the image associated with the new image information to an image forming processor, among image forming processors, that is operated by the recipient, wherein in a case where an update condition that the new processing procedure and the previous processing procedure are the same and that the recipient associated with the new processing procedure and a recipient that is associated with the previous processing procedure are the same is satisfied, the update processor updates the pre-formation image information with the new image information.

18. A non-transitory computer readable medium storing an information processing program causing a computer to function as the processors of the information processing apparatus according to claim 17.

* * * * *